United States Patent [19]
Donald

[11] Patent Number: 5,732,168
[45] Date of Patent: Mar. 24, 1998

[54] THERMAL OPTICAL SWITCHES FOR LIGHT

[75] Inventor: David K. Donald, Monte Sereno, Calif.

[73] Assignee: Hewlett Packard Company, Palo Alto, Calif.

[21] Appl. No.: 551,236

[22] Filed: Oct. 31, 1995

[51] Int. Cl.$^6$ ..................................................... G02B 6/35
[52] U.S. Cl. .................... 385/16; 385/18; 385/19
[58] Field of Search .................... 385/16, 17, 18, 385/19, 5, 125

[56] References Cited

U.S. PATENT DOCUMENTS

| | | | |
|---|---|---|---|
| 4,490,728 | 12/1984 | Vaught et al. | 346/1.1 |
| 4,505,539 | 3/1985 | Auracher et al. | 385/19 |
| 4,640,592 | 2/1987 | Nishimura et al. | 385/125 |
| 4,988,157 | 1/1991 | Jackel et al. | 350/96.13 |
| 5,073,000 | 12/1991 | Derfiny | 385/14 |
| 5,210,801 | 5/1993 | Fournier et al. | 385/14 |
| 5,255,332 | 10/1993 | Welch et al. | 385/17 |
| 5,382,985 | 1/1995 | Becker et al. | 385/5 |
| 5,408,548 | 4/1995 | Olmstead | 385/16 |
| 5,440,654 | 8/1995 | Lambert, Jr. | 385/17 |

OTHER PUBLICATIONS

Makoto Sato, "Electrocapillarity Optical Switch", OFC '94 Technical Digest, pp. 149–150, 1994 (No Month).

Janet L. Jackel, John J. Johnson, and W. J. Tomlinson, "Bistable Optical Switching Using Electrochemically Generated Bubbles", Optic Letters, vol. 15, No. 24, Dec. 15, 1990, pp. 1470–1472.

*Primary Examiner*—John D. Lee
*Assistant Examiner*—Ellen Eunjoo Kang

[57] ABSTRACT

A thermal optical switching cell has a channel of either gas or boilable liquid that crosses an optical waveguide at a forty-five degree angle. Two or more appropriately placed heaters use the water/steam/dry states of thermal ink jet technology to quickly insert, or extract, boilable liquid respectively into, or from, the channel. The boilable liquid has an index of refraction close to that of the guide. In the wet state, the channel contains the liquid and nearly all the light of the incoming guide traverses the liquid along the axis of the guide. In the dry state, the channel contains gas. Total internal reflection (TIR) occurs and light is directed at right angles away from the axis of the incoming channel. Adding a second waveguide, perpendicular to, and intersecting the first waveguide at the channel, forms a cross-bar switch. These liquid switching cells toggle between the wet and dry states. No power is required to hold the switch in the most recent state. A monitoring signal is described that can be used to determine the state of the switch. The dry state of these cells is totally internally reflecting. The wet state, however, is transmissive with a small, but objectionable, amount of reflection. A push-pull optical circuit is formed using paired cells and at least one TIR mirror. One of the cells of the circuit is always in the TIR, state to provide good isolation. This circuit has the property of reporting the state of the switch-pair so that a fault can be detected. If a fault is detected, repeated activation pulses can be applied to force liquid into the correct places to maintain proper operation of the circuit.

5 Claims, 8 Drawing Sheets

THERMAL OPTICAL SWITCHES FOR LIGHT

BACKGROUND OF THE INVENTION

1. Field of the Invention

The present invention relates generally to optical switches. In particular, the invention relates to bistable optical switches that can be implemented in an integrated array.

2. Description of the Related Art

Fiber optics are used in a wide variety of applications. One application is in the area of communication systems. In such application, information signals, in the form of modulations of laser-produced light, are transmitted to, and received from, a plurality of terminals through fiber optic cables. A switching network is provided to selectively direct the information signals to, and from, the terminals. Typically, the switching network converts light emitted by transmitting one of the terminals into corresponding electrical signals. The electrical signals are directed to a selected output port of the switching network by electrical circuitry in the switching network. The electrical signals at the output port are converted into corresponding modulated light for retransmission through fiber optic cables to a receiving one of the terminals. The conversion of the modulated light to electrical signals and then back into modulated light energy, together with the electrical switching circuitry, requires the use of expensive components and/or restricts the potential bandwidth of the data communication system.

Recently, a number of optical switching systems have been developed. As the name implies, in optical switching networks, light emitted by typically any one of the cables is switched to another one of the cables without requiring intermediate conversion of the transmitted light data into electrical signals and then re-conversion of the electrical signal into light data. U.S. Pat. No. 5,255,332, Welch, et al., issued Oct. 19, 1993, entitled "NXN Optical Crossbar Switch Matrix", (hereinafter "Welch"), describes one such optical switching system and provides a survey of optical switches that employ various schemes to achieve the switching.

One optical switch described in Welch is that of Jackel, et al., U.S. Pat. No. 4,988,157, issued Jan. 29, 1991, entitled "Optical Switch Using Bubbles", (hereinafter "Jackel"). The Jackel optical switch is particularly useful as a bistable cross-connect matrix. Parallel input waveguides and parallel output waveguides are formed on a substrate at perpendicular angles so as to intersect. A forty-five degree slot is formed across each intersection and is filled with a fluid having a refractive index matching the waveguide material. Electrodes are positioned adjacent the slots and are selectively activated to electrolytically convert the fluid to gaseous bubbles. The bubbles destroy the index matching to the waveguide material and cause light to be reflected by the slot rather than propagate across the slot. In the presence of a catalyst, a pulse of opposite polarity, or of sufficient size and of the same polarity, will destroy the bubble.

Thus, the electrolyte associated with each intersection is selectively activated to alternately form and remove a gaseous bubble in the index-matching fluid at the slot. When the index-matching liquid fills the respective slot, the optical signal simply passes through the intersection. When the gaseous bubble displaces the index-matching liquid however, the index mismatch at the waveguide-slot interface causes the light to be reflected from the side of the slot into the intersecting waveguide. The bubble can be made bistable. That is, once created, the bubble will remain for periods of days.

Although bistable, the switch will ultimately fail when the bubble dissipates. Therefore, the switch must be periodically tested and/or reset to ensure proper operation during long-term periods (i.e., a week or longer). Furthermore, if a liquid that has an index of refraction closely matching that of the waveguides, such as an oil, is employed in the switch, the liquid can crack and oxidize. Thus, over time, the liquid will degrade into a varnish and the switch will not operate properly. On the other hand, water or light alcohols will not decompose when used in the switch. These liquids, however, do not have an index of refraction that closely matches that of the waveguide, thereby introducing reflection-associated crosstalk into the switch. Moreover, using electrolysis to create and remove bubbles can result in an unacceptably slow switching time for some applications.

SUMMARY OF THE INVENTION

A thermal optical switching cell is described that has a channel of either gas or boilable liquid crossing an optical waveguide at a forty-five degree angle. Two or more appropriately placed heater elements use the water/steam/dry states of thermal ink jet technology to quickly insert, or extract, boilable liquid respectively into, or from, the channel. The boilable liquid has an index of refraction close to that of the guide. In the wet state, the channel contains the liquid and nearly all the light of the incoming guide traverses the liquid along the axis of the guide. In the dry state, the channel contains gas. Total internal reflection (TIR) occurs and light is directed at right angles away from the axis of the incoming channel. A cross-bar switch is formed by adding a second waveguide, perpendicular to, and intersecting, the first waveguide at the channel.

These liquid switching cells toggle between the wet and dry states. A monitoring signal is also described that can be used to determine the state of the switch. No power is required to hold the switch in the most recent state.

The dry state of these cells is totally internally reflecting. The wet state, however, is transmissive with a small, but objectionable, amount of reflection. A push-pull optical circuit is formed using paired cells and at least one TIR mirror. One of the cells of the circuit is always in the TIR state to provide good isolation. This circuit also has the property of reporting the state of the switch-pair so that a fault can be detected. If a fault is detected, repeated activation pulses can be applied to force liquid into the correct places to maintain proper operation of the circuit.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–8. Those skilled in the art will readily appreciate that the detailed descriptions given herein with respect to these figures are for explanatory purposes however because the invention extends beyond these limited embodiments.

The invention concerns a mechanism to provide a thermal optical switch. A heater element is used to create bubbles at the crosspoint of an optical crossbar. A bubble filling the crosspoint will switch the crosspoint from transmission to total internal reflection. With one single heater alone, capillary force will make continuous heat a likely requirement. By adding holes in the liquid path walls, however, the expelled liquid from the boiling can be made to stop the back flow and a stable toggle achieved. A second resistor is then used to create a shot of fluid to again fill the void volume.

Figure 1:
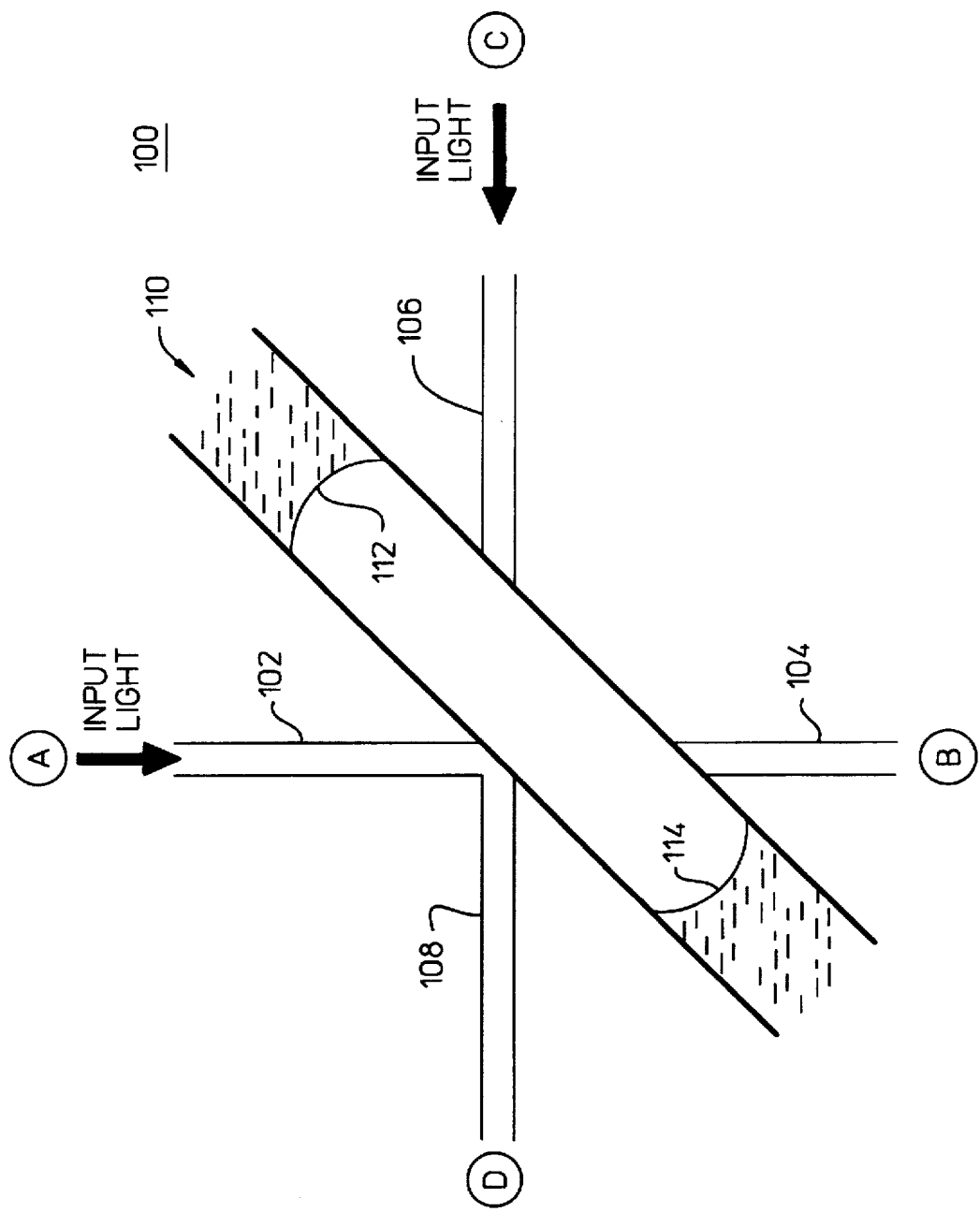
FIG. 1 is a plan view of the central area of an optical switch that creates a bubble in a filled liquid channel to redirect light at a crosspoint.

FIG. 1 is a plan view of the central area of an optical switch that creates a bubble in a filled liquid channel to redirect light at a crosspoint.

In the simplest heater system, the apparatus is filled with liquid. Then a single heater can be used to create a bubble. If the heater is turned off, however, the bubble will go away. Thus, this approach is not toggling, but requires continuous power to maintain the bubble mirror.

FIG. 1 shows a switching zone flooded with liquid, but with a gas bubble in the area of the intersection of the waveguides. In FIG. 1, a thermal optical switching cell 100 has a channel 110 crossing at a forty-five degree angle a first optical waveguide pair AB formed by waveguides 102 and 104. Meniscus 112 and meniscus 114 indicate that the portion of channel 110 intersecting waveguides 102 and 104 is in a dry state. That is, channel 110 contains a bubble of a boilable liquid, such as water or a light alcohol, having an index of refraction close to that of waveguides 102 and 104. In the wet state, channel 110 contains the liquid and nearly all the light of incoming guide 102 would traverse the liquid along the axis of guide 102 to enter outgoing guide 104.

Similarly, channel 110 of thermal optical switching cell 100 crosses (at a forty-five degree angle) a second optical waveguide pair CD formed by waveguides 106 and 108. Waveguides 106 and 108 also have an index of refraction close to that of the boilable liquid of channel 110. Thus, in the wet state, nearly all the light of incoming guide 106 traverses the liquid along the axis of guide 106 to enter outgoing guide 108.

A single ejection heater (not shown in this figure) would be located at the intersection of channel 110 and waveguides 102, 104, 106 and 108. The ejection heater is a heater element that uses the water/steam/dry states of the liquid in the channel to perform the switching. For this switching, the thermal ink jet technology is used to quickly extract the boilable liquid from channel 110. Briefly stated, careful application of an electrical current to a resistor can produce heat to cause the explosive formation of a vapor bubble within the liquid, thereby ejecting the liquid from an orifice. Heater elements such as the heater element of the ejection heater are well known in the art of thermal ink printing. For example, U.S. Pat. No. 4,490,728, Vaught et al., issued Dec. 25, 1984, entitled "Thermal Ink Jet Printer", (hereinafter "Vaught"), describes a suitable heating element.

Ejection of the liquid from channel 110 causes thermal optical switch 110 to enter a dry state. In the dry state, channel 110 contains gas causing total internal reflection (TIR) to occur. Thus, light of an incoming guide is directed at right angles away from the axis of the guide. For example, when channel 110 is in the dry state, light A from incoming guide 102 will not enter guide 104 (as would be the case when channel 110 is in the wet state). Rather, when channel 110 is in the dry state, the light from guide 102 will be reflected at right angles to guide 104 along path D. In the drawing, guide 108 is shown in that path.

Therefore, channel 110 forms an optical switch for the waveguide pair formed by guides 102 and 104. A cross-bar switch is formed by adding a second waveguide pair (i.e., guides 106 and 108) perpendicular to, and intersecting, the first waveguide pair at channel 110. Thus, guides 102, 104, 106 and 108 are the four arms of the cross-bar switch.

Figure 2:
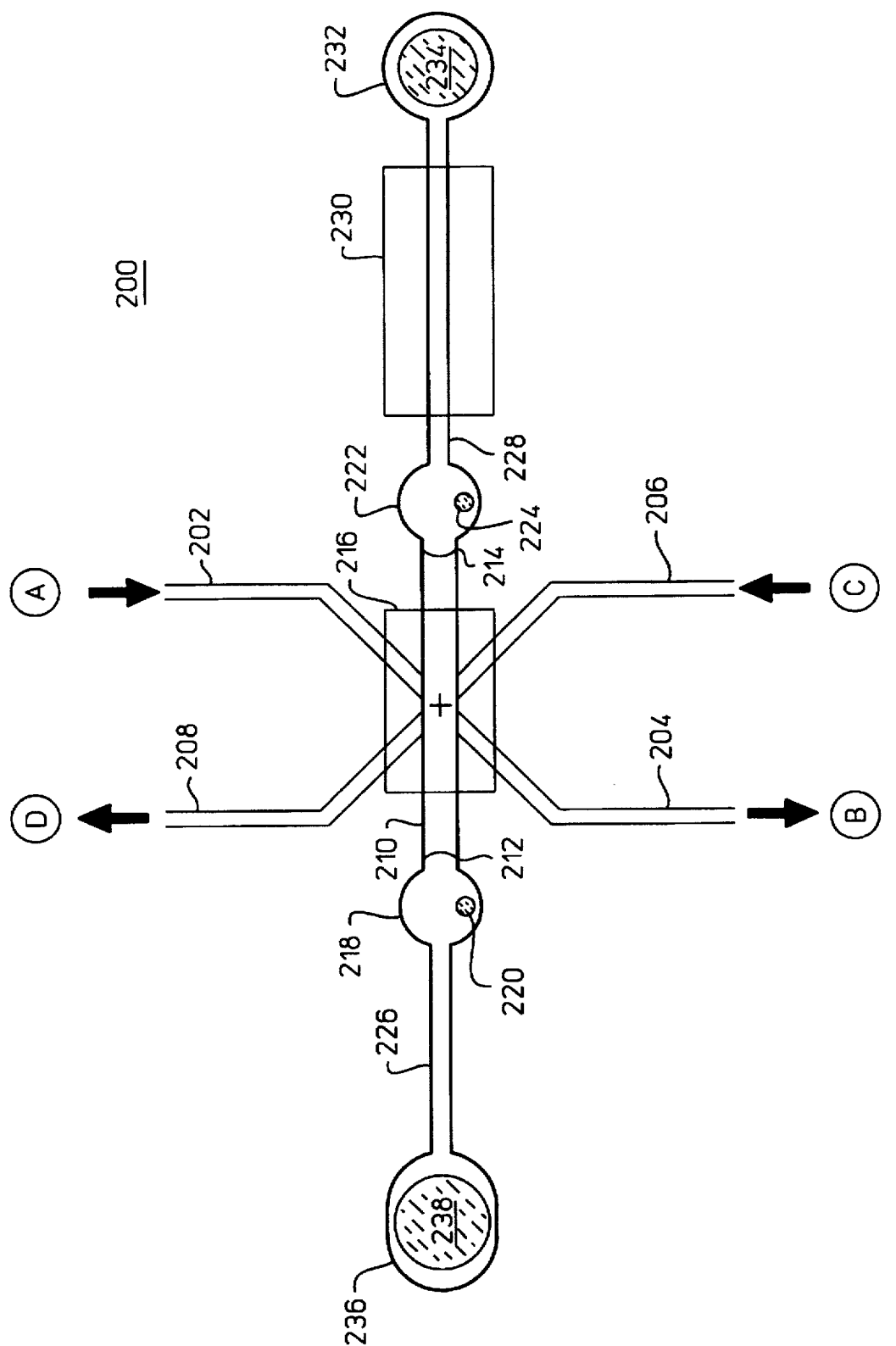
FIG. 2 is a plan view of a bistable optical switch that employs a thermal ejector to create a bubble at an optical crossbar and a single thermal injector to remove the bubble.

This then, with one heater and a large volume of fluid, is the simplest switch. FIG. 2 shows an improvement on that of FIG. 1.

FIG. 2 is a plan view of a bistable optical switch that employs a thermal ejector to create a bubble at an optical crossbar and a single thermal injector to remove the bubble. A toggle-able system is formed by using a pair of heaters. A first heater is used to eject liquid from the crosspoint and a second heater is used to inject liquid back into the crosspoint. This permits one to toggle the system, and then turn off power. This toggle can last until the liquid evaporates from the system. Thus, if there is a nearby pool to replenish the liquid supply, this system will last virtually forever.

As in FIG. 1, switch 200 of FIG. 2 uses the same paths of waveguide pairs AC and BD. In switch 200, the amount of available liquid is carefully limited. In switch 200 of FIG. 2, injector heater 230 is used to shoot the boilable liquid stored in capillary reservoir 234 of region 232 into channel 210. Breather spots 218 and 222, containing capillary reservoirs 220 and 224 respectively, provide pressure relief ports to the atmosphere and permit injector heater 230 to shoot the liquid into channel 210. Finally, capillary reservoir 238 of pool 236 captures ejected liquid and provides a reservoir pool from which evaporated liquid is replenished. Capillary reservoirs 220, 224, 234 and 238 can be made from an absorbent material such as foam rubber.

Many different liquids can be used with each having associated advantages and disadvantages. Water or light alcohols do not have an index of refraction that matches the index of the waveguide as closely as would other liquids such as oils. Water or light alcohols, do not decompose as would the other liquids. One must, however, protect against the buildup of bacteria or viruses in the water or light alcohols (e.g., by adding a disinfectant such as bleach to the liquid). The capillary reservoirs are a good place to store such a disinfectant and thereby to prevent the formation of bacterial or viral contamination.

Care must also be taken when designing the system to avoid splatter. Sharp corners can cause foam to develop in the liquid system. This problem can be overcome by not providing a lot of space that can cause droplets to form. The elemental cell should also be provided with breather channels to provide breather spots to the atmosphere.

Furthermore, the radius of the channel pipe in the neighborhood of the crosspoint is important. The radius of the channel pipe can be chosen so as to allow liquid to reside (virtually forever) in the area of the crosspoint. The liquid of the channel pipe should not be allowed to drain out by capillary action. This drainage can be prevented by using a smaller radius for a reservoir pipe 228 than for the channel pipe.

Figure 3:
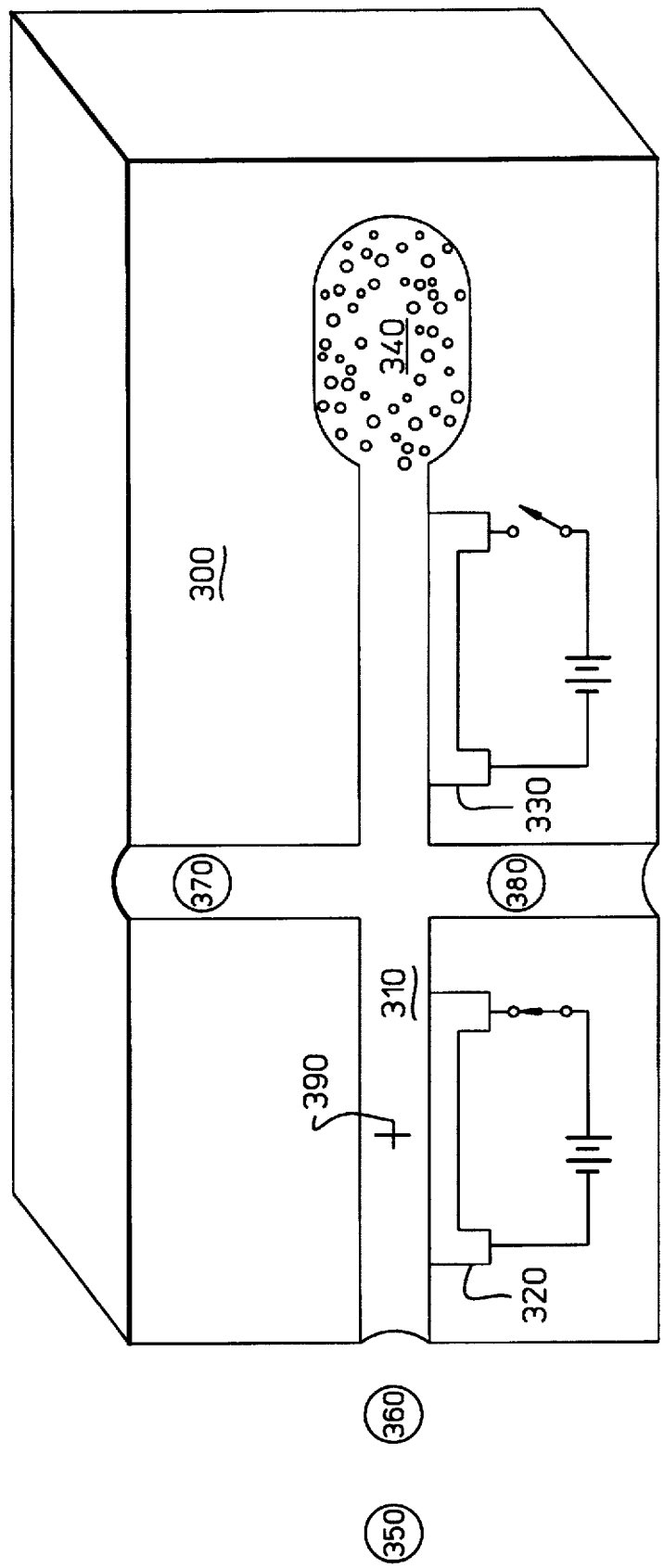
FIG. 3 is a side view of a bistable optical switch having a single thermal injector and a single thermal ejector.

FIG. 3 is a side view of a bistable optical switch having a single thermal injector and a single thermal ejector. In switch 300, thermal ejector 320 is shown ejecting liquid droplets 350, 360, 370 and 380 from channel 310. This action will place channel 310 of switch 300 into a dry state. Later, thermal injector 330 can be used to inject liquid from reservoir 340 into channel 310. Although not shown, two optical waveguides would intersect channel 310 and each other at crosspoint 390.

Figure 4:
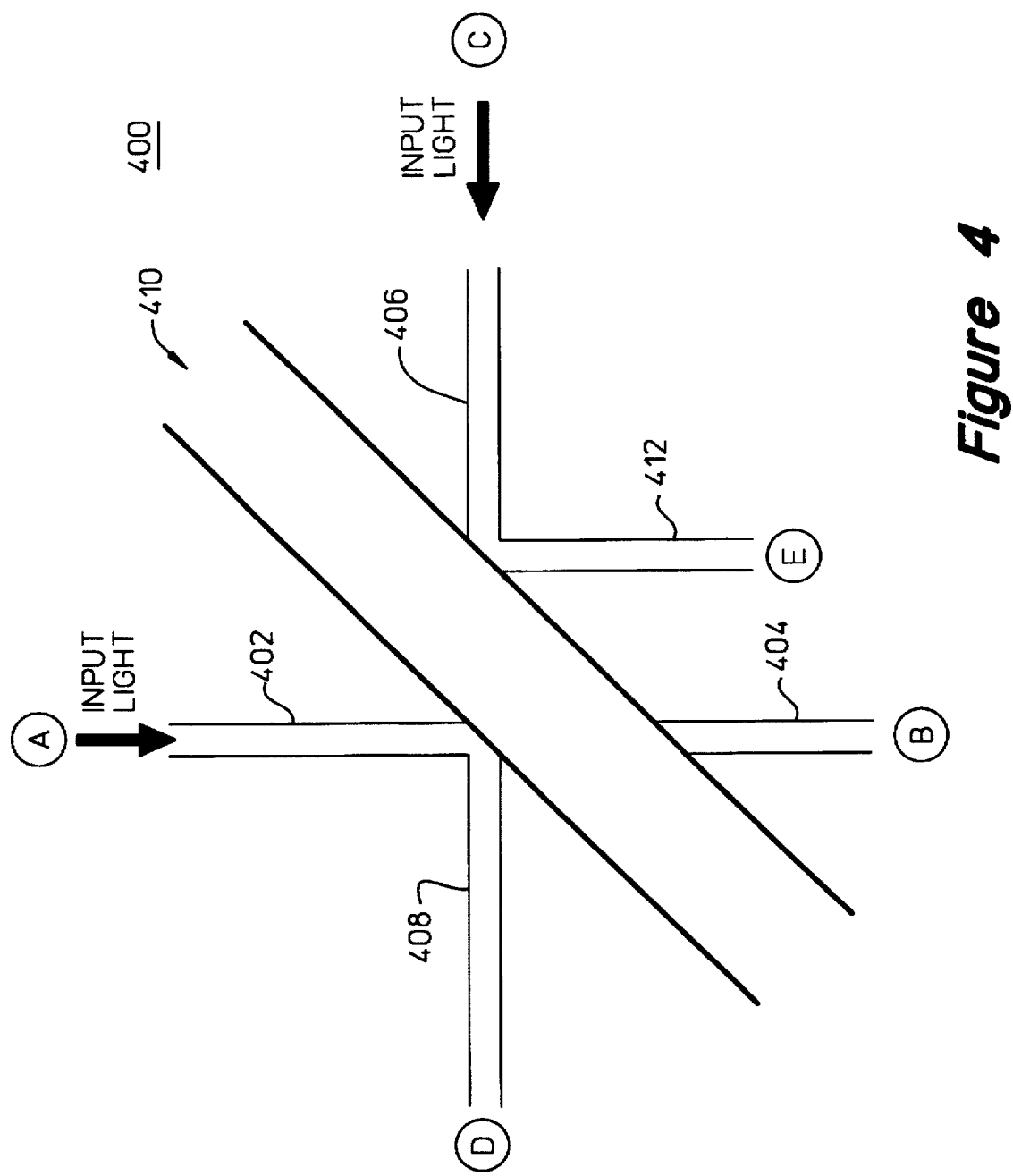
FIG. 4 is a plan view illustrating a portion of a bistable optical switch of the present invention having an isolated supervisory path to check the state of the switch.

A geometric configuration can be established between the waveguides and the channel so as to establish a monitoring signal that can be used to determine the state of the switch. FIG. 4 is a plan view illustrating a portion of a bistable optical switch of the present invention having an isolated supervisory path to check the state of the switch. In FIG. 4, a portion of a crossbar 400 is shown wherein a first waveguide pair formed by guides 402 and 404 intersects a second waveguide pair formed by guides 406 and 408. Channel 410 also intersects the two waveguide pairs. Thus, channel 410 forms a forty-five degree angle with each waveguide 402, 404, 406 and 408. Waveguide 412 is parallel to waveguide 402 and intersects waveguide 406 perpendicularly at channel 410.

The path 'CE' provides an isolation path in the "off" reflecting state, i.e., when channel 410 is in the dry state. In the "on" state, i.e., when channel 410 is in the wet state, paths 'AB' and 'CD' are independent through states.

A supervisory monitoring signal extracted from 'E' almost unambiguously identifies the state of switch 400. If the monitoring signal from 'E' is received, then the state of switch 400 is dry ("off") and it is reasonable to infer that the 'AB' path will be strongly transmitting.

Figure 5:
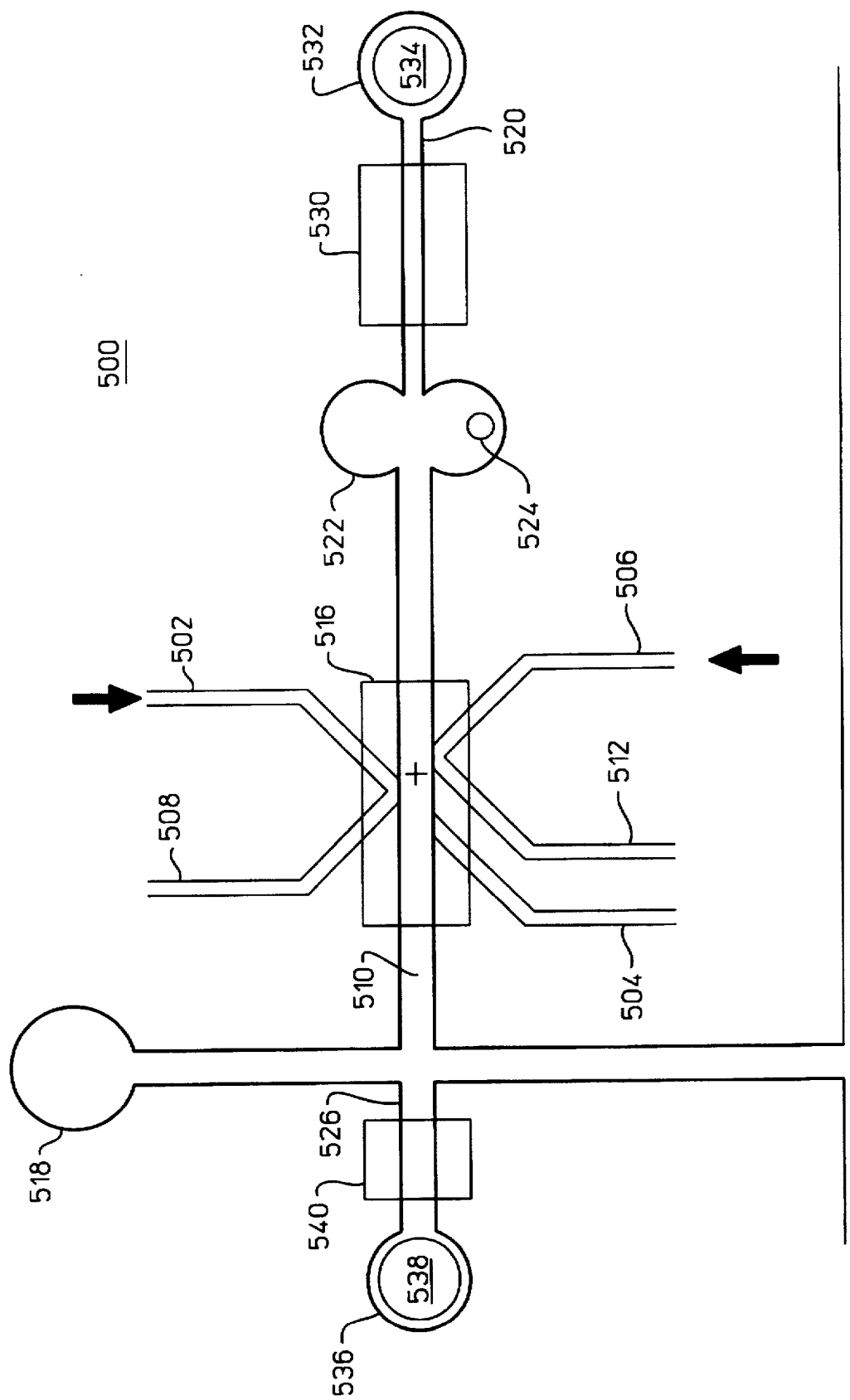
FIG. 5 is a plan view of a bistable optical switch that employs a thermal ejector to create a bubble at an optical crossbar and paired thermal injectors to remove the bubble.

FIG. 5 is a plan view of a bistable optical switch that employs a thermal ejector to create a bubble at an optical crossbar and paired thermal injectors to remove the bubble. In FIG. 5, thermal optical switching cell 500 has a channel 510 crossing at a forty-five degree angle a first optical waveguide pair formed by waveguides 502 and 504. The portion of channel 510 intersecting waveguides 502 and 504 can be placed in a wet state or in a dry state. In the wet state, channel 510 contains a boilable liquid such as water or a light alcohol having an index of refraction close to that of waveguides 502 and 504. When channel 510 contains the liquid, nearly all the light of incoming guide 502 traverses the liquid along the axis of guide 502 and enters outgoing guide 504.

Similarly, channel 510 of thermal optical switching cell 500 crosses, at a forty-five degree angle, a second optical waveguide pair formed by waveguides 506 and 508. Waveguides 506 and 508 also have an index of refraction close to that of the boilable liquid of channel 510. Thus, in the wet state, nearly all the light of incoming guide 506 traverses the liquid along the axis of guide 506 to enter outgoing guide 508.

Ejection heater 516 is located at the intersection of channel 510 and the four arm waveguides 502, 504, 506 and 508. Ejection heater 516 is a heater element that uses the water/steam/dry states of thermal ink jet technology to quickly extract the boilable liquid from channel 510. Ejection of the liquid from channel 510 causes thermal optical switch 500 to enter a dry state. In the dry state, channel 510 contains gas causing total internal reflection (TIR) to occur. Thus, light of an incoming guide is directed at right angles away from the axis of the guide. For example, when channel 510 is in the dry state, light from incoming guide 502 will not enter guide 504 (as would be the case when channel 510 is in the wet state). Rather, when channel 510 is in the dry state, the light from guide 502 will be reflected at right angles to guide 508.

Therefore, channel 510 forms an optical switch for the waveguide pair formed by guides 502 and 504. Guide 512 is perpendicular to guide 502 and intersects guide 502 at channel 510. Thus, the fifth arm, guide 512 provides a monitoring signal of line 502 input as described previously in conjunction with FIG. 4. A cross-bar switch is formed by adding a second waveguide pair (i.e., guides 506 and 508), perpendicular to, and intersecting, the first waveguide pair at channel 510.

In switch 500 of FIG. 5, opposing injector heaters 530 and 540 are used together to shoot the boilable liquid into channel 510. The boilable liquid for injector heater 530 is stored in capillary reservoir 534 of region 532 and channel 520. The boilable liquid for injector heater 540 is stored in capillary reservoir 538 of region 536 and channel 526. Breather spots 518 and 522, containing capillary reservoir 524, provide pressure relief ports to permit injector heaters 530 and 540 to shoot the liquid into channel 510.

Figure 6:
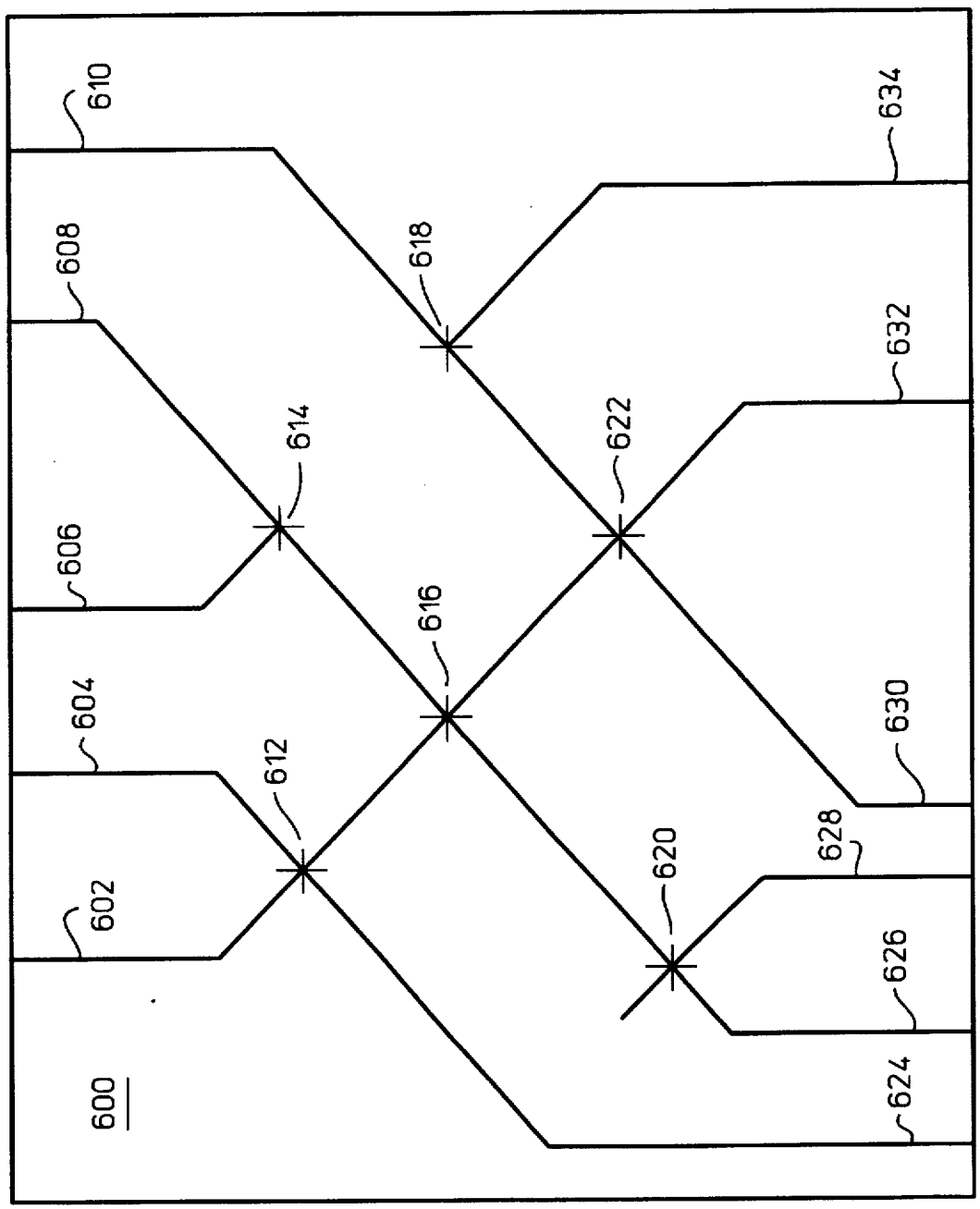
FIG. 6 is a plan view of a substrate having an optical crossbar matrix that employs bistable optical switches of the present invention.

Regardless of whether a single or multiple injector system is used, multiple elemental cells can be combined to form an optical crossbar matrix. FIG. 6 is a plan view of a substrate having an optical crossbar matrix that employs bistable optical switches of the present invention. In FIG. 6, optical crossbar matrix 600 can selectively optically couple waveguides 602, 604, 606, 608, 610, 624, 626, 628, 630, 632 or 634. Elemental cells are located at crosspoints 612, 614, 616, 618, 620 and 622. Each elemental cell can be independently placed into either a wet or dry state. Thus, light can be steered through crossbar matrix 600.

In the above described thermal optical cells one state is totally internally reflecting (TIR), and the other state is transmissive with a small, but possibly objectionable, amount of reflection. Therefore, in these switch cells the index of the liquid must be very close to that of the guide. If the index of the liquid differs at all from that of the guide, reflections occur. If thermal ink jet technology is used to remove liquid from the area of a cell, then indexes are limited to those of materials that do not break down in boiling. Water and light alcohols boil nicely, but for some applications, they do not have indexes close enough to that of the guide to provide acceptable switching in the wet state.

An optical circuit will now be described which dramatically improves the isolation between states in an optical version of certain cross-bar switches. Each input signal is switched independently and may exit on either the x or y axis, but not both. The circuit builds on switching cells such as those previously described which have excellent isolation in one state and poor isolation in the other. This circuit removes the objectionable leakage reflection for each of the two axes. This is accomplished through the use of a double-capsule push-pull optical circuit for the liquid switches. Cells in this circuit are used in pairs and one of the elements will always be in the TIR, state to ensure isolation. The reliability of switching is always a concern. This circuit has the property of reporting the state of the switch-pair so that a fault can be detected. If such a fault is detected, repeated activation pulses can then be applied to replace and/or remove liquid as required to correct the failure condition.

Figure 7:
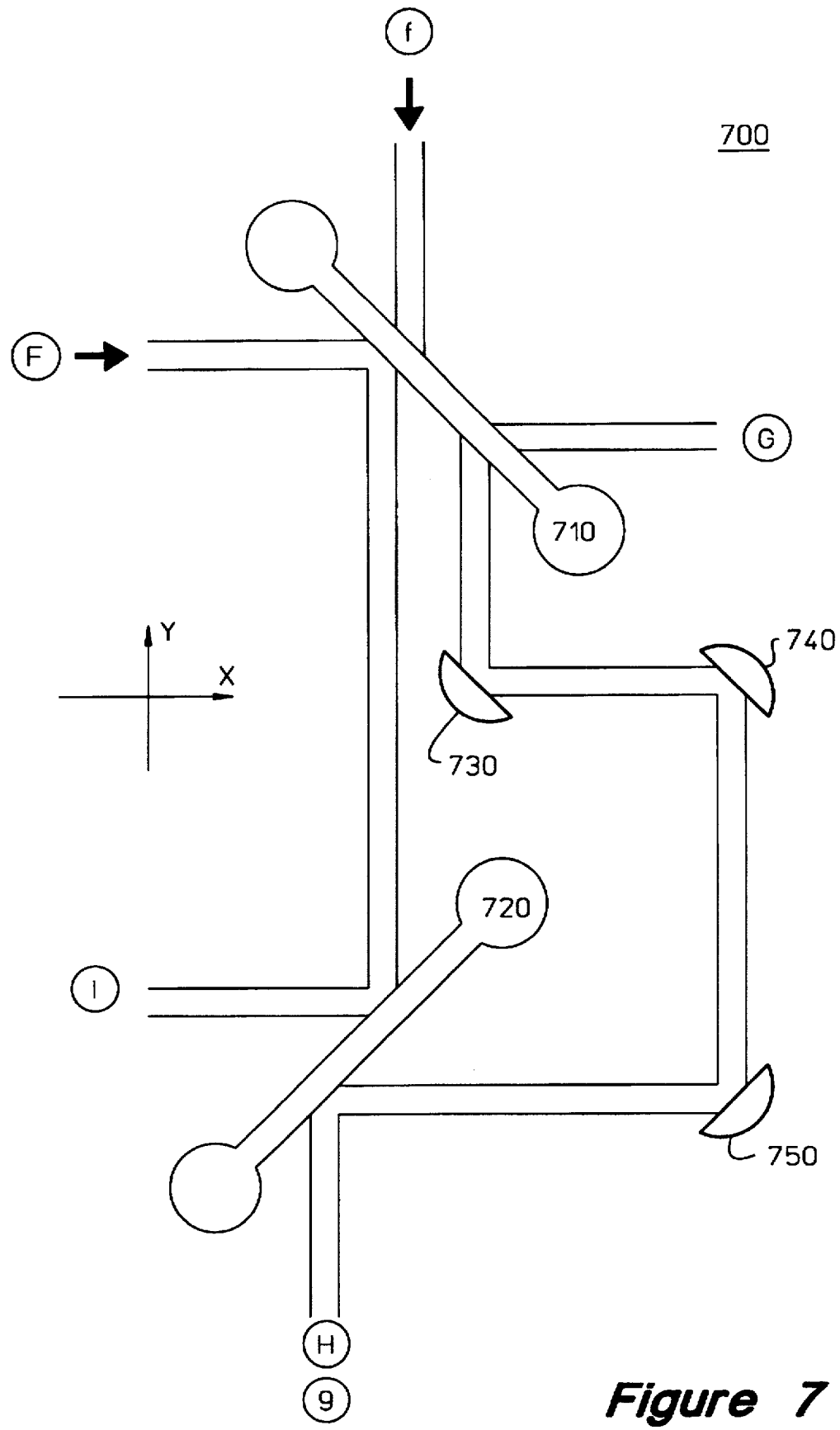
FIG. 7 is a plan view of a push-pull pair of bistable optical switches that operate in conjunction with three total internal reflection mirrors to reduce crosstalk and provide a monitor signal to indicate error conditions.

FIG. 7 is a plan view of a push-pull pair of bistable optical switches that operate in conjunction with three total internal reflection mirrors to reduce crosstalk and provide a monitor signal to indicate error conditions. Upper capsule 710 and lower capsule 720 of circuit 700 operate in a push-pull manner in conjunction with TIR, mirrors 730, 740 and 750. A TIR, mirror is formed by "punching" a hole in the glass or plastic transmitting plate, thereby creating a gas bubble. Actually, the TIR must have a flat surface, thus a precise method such as etching is used to form the TIR mirror.

Capsules 710 and 720 can be any of the elemental cells previously discussed that employ a liquid having an index of reflection with a sufficient mismatch to that of the waveguides of circuit 700 to introduce objectionable reflection. The push-pull nature of circuit 700 implies that when capsule 710 is placed in the wet state, capsule 720 will be placed in the dry state. Conversely, when capsule 710 is placed in the dry state, capsule 720 will be placed in the wet state. During normal operation of circuit 700, it will never be the case that capsules 710 and 720 will either both be dry or both be wet.

In FIG. 7, optical circuit 700 is one switch-point of a matrix of switches (not shown). In the drawing, there are two input arms, 'F' and 'f', that arrive at the crosspoint of upper capsule 710 along paths parallel to the x and y axes, respectively. Thus, input arms 'F' and 'f' arrive under the heater (not shown) used to eject liquid from the switching area of capsule 710. In the following discussion the light from 'F' will be analyzed for different cases. Then, the light from 'f' and its paths will be examined. After traversing optical circuit 700, the outputs will be attenuated but will be isolated. That is, either 'F' or 'f' will be output, with no mixed contributions.

When upper capsule 710 is dry and lower capsule 720 is wet, the operation of circuit 700 is relatively straightforward. Because the switching point of upper capsule 710 is in the dry state, the x-axis input 'F' is crossed into the y axis. Light from 'F' enters capsule 710, reaches the dry channel, undergoes TIR and exits upper capsule 710 as 'H' light. Because lower capsule 720 is in the wet state, this light traverses lower capsule 720 and exits parallel to the y axis. No light from 'F' exits circuit 700 along the x axis. No light exits at 'G' when upper capsule 710 is in the dry state. Further, when upper capsule 710 is dry, light entering at 'f' parallel to the y axis undergoes TIR and is lost. No y-axis light exits along the lower y axis.

When the upper capsule 710 is wet and lower capsule 720 is dry, the operation of circuit 700 is more complex. Because upper cell 710 is wet, there will be a small index mismatch in the gap of the channel of cell 710. For input light 'F', the light 'G' will exit cell 710 when cell 710 is in the wet state. Similarly, for input light 'f', the light 'g' will exit cell 710 when cell 710 is in the wet state. The light exiting cell 710 will be offset somewhat from the entry light because of the refraction and path length within the channel. (This offset is exaggerated in the drawing.) Furthermore, when cell 710 is in the wet state, a small amount of light from 'F' will exit toward 'H' (i.e., at right angles to the through path). Were it not for the dry state of lower cell 720 that blocks the light, this reflected light traveling down from the wet-state cell 710 would be a problem.

Thus, when upper cell 710 is wet, light entering from 'F' emerges along the x axis at 'G' and continues along that axis to the next switch point in the system. Some small amount of 'F' light is reflected down path 'H'. This small amount of light reaches the lower cell 720 (which is in the dry state) and undergoes TIR, thereby exiting as waste light at 'I'. Therefore, no light from 'F' via 'H' exits the bottom of circuit 700 when upper cell 710 is in the wet state.

Provision is next made to allow y-axis light 'f' through the switch-point circuit 700. In this cross-bar switching arrangement, light will be coming down from switch points above circuit 700 as 'f'. When the 'f' light is to be selected, circuit 700 permits this y-axis light to traverse cells 710 and 720 to be output from circuit 700. Light from 'f' traverses through upper cell 710, is reflected by three sequential TIR mirrors 730, 740 and 750 to the lower cell 720, emerging from cell 720 as 'g'. Because lower cell 720 is dry, TIR, carries the 'g' light out the bottom of cell 720 along the y-axis without contamination from x-axis light.

A monitoring signal is a beneficial aspect of the push-pull configuration. Circuit 700 is self-diagnosing for the most likely forms of failure which occur when liquid and gas are in the wrong place. Port 'I' is the diagnostic port of circuit 700. If the two cells 710 and 720 are operating properly, then the output at 'I' is 'r', the reflection coefficient for a wet channel and has a weak reference value 'r'. The value of 'r' is determined by the index difference between guide and fluid. The diagnostic signal for proper operation is fixed, set by the reflection coefficient 'r' regardless of which cell is in the wet state. If cells 710 and 720 are both dry, the output at 'I' is unity (high), thereby demonstrating a failure. If cells 710 and 720 are both wet cells, the output at 'I' is r*r (i.e., very weak), thereby also demonstrating a failure.

Thus, the weak monitoring signal has a known value unless there is a failure (caused by either two dry cells or two wet cells). The weakness of the monitoring signal during normal operation permits one to collect several monitoring signals into a single failure detector. If any of the pairs of cells associated with one of the monitoring signals fails, the detector can cause all of the cell pairs in the area of the matrix to which the combined monitoring signal corresponds to be reset to their desired states.

In a coplanar matrix, collection of multiple monitoring signals presents a topological problem in that crosstalk will be introduced when the monitoring signal crosses a waveguide. The monitoring signal will be weak during normal operation, however, hence very little monitoring signal crosstalk will be introduced during normal operation. The crosstalk introduced by the monitoring signal will be most pronounced when there has been a failure of a push-pull pair, in which case the matrix will not be operating properly and reinitialization of the failed pair will be desired. Once the failed pair has been reinitialized, the crosstalk from the monitoring signal will return to a weak signal thereby indicating that the system is operating properly.

Alternatively, monitoring signal crosstalk can be avoided by providing a TIR mirror for each monitoring signal. Each TIR mirror can be positioned to force its associated monitoring signal to leave the plane of the switching matrix before the monitoring signal crosses a guide of the switching matrix.

When a coplanar matrix is formed, it is desirable to have a low crosstalk component wherever a waveguide crosses another waveguide at right angles. For some embodiments, a crosstalk component of one part in one hundred may be acceptable (i.e., approximately twenty decibels down). Lower amounts of crosstalk may be required for most uses, thus a crosstalk component of one part in one million to one part in ten million (i.e., approximately seventy decibels down) would be an acceptable amount for most matrices.

Figure 8:
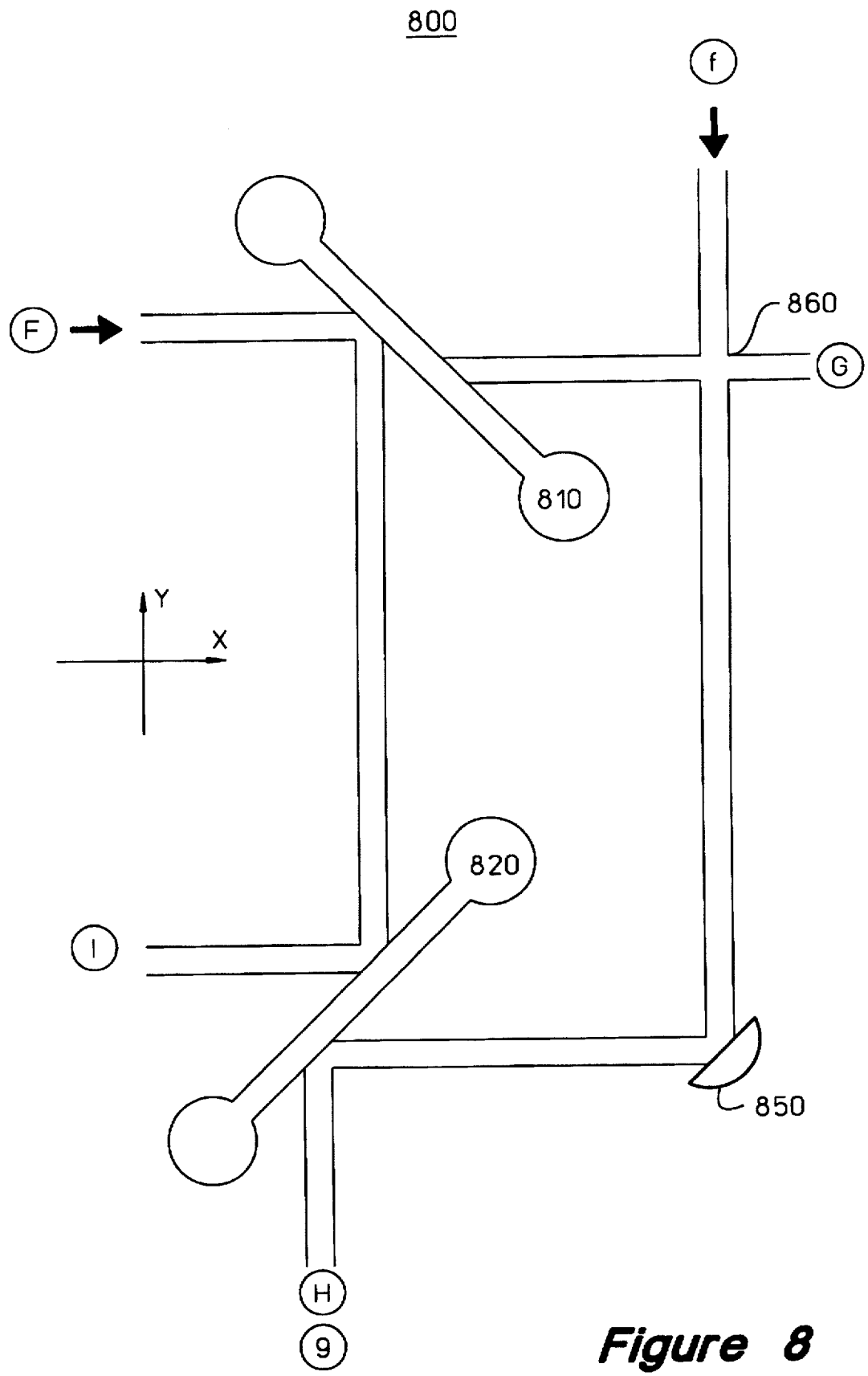
FIG. 8 is a plan view of a push-pull pair of bistable optical switches that operate in conjunction with a single total internal reflection mirror to reduce crosstalk and provide a monitor signal to indicate error conditions.

An alternative embodiment push-pull circuit can be formed that employs fewer parts than the circuit 700 of FIG. 7. FIG. 8 is a plan view of a push-pull pair of bistable optical switches that operate in conjunction with a single total internal reflection mirror to reduce crosstalk and provide a monitor signal to indicate error conditions. There are three elements: two gas/liquid elemental switching cells that operate cooperatively in a push-pull manner such that when the one is wet, the other is dry; and a TIR mirror 850 formed by a gas cavity in the substrate. This arrangement uses a crossed pair of waveguides 860. In order for circuit 800 to provide true isolation, waveguides 860 must be free of crosstalk from the x to y and the y to x axes. Thus, the amount of isolation provided by circuit 800 will depend upon the amount of crosstalk introduced by a crossed pair of waveguides 860.

Signal loss in the push-pull circuit is decreased by using one TIR mirror per circuit instead of three. This is because each TIR mirror introduces a small amount of loss, therefore using fewer TIR mirrors per circuit decreases TIR, mirror-induced loss. Furthermore, the circuit having fewer components has reduced topological design and manufacturing complexity over the circuit having more components.

Upper capsule 810 and lower capsule 820 of circuit 800 operate in a push-pull manner in conjunction with TIR, mirror 850. Capsules 810 and 820 can be any of the elemental cells previously discussed that employ a liquid having an index of reflection with a sufficient mismatch to that of the waveguides of circuit 800 to introduce objectionable reflection. As previously described, the push-pull nature of circuit 800 implies that when capsule 810 is placed in the wet state, capsule 820 will be placed in the dry state. Conversely, when capsule 810 is placed in the dry state, capsule 820 will be placed in the wet state. During normal operation of circuit 800, it will never be the case that capsules 810 and 820 will either both be dry or both be wet.

In FIG. 8, optical circuit 800 is one switch-point of a matrix of switches (not shown). In the drawing, there are two input arms, 'F' and 'f', that arrive at the crosspoint 860 along paths parallel to the x and y axes, respectively. Thus, unlike the previous case, input arms 'F' and 'f' are displaced from each other and do not intersect under the heater (not shown) used to eject liquid from the switching area of capsule 810. In the following discussion the light from 'F' will be analyzed for different cases. Then, the light from 'f' and its paths will be examined. After traversing optical circuit 800, the outputs will be attenuated but will be isolated. That is, either 'F' or 'f' will be output, with no mixed contributions.

When upper capsule 810 is dry and lower capsule 820 is wet, the operation of circuit 800 is relatively straightforward. Because the switching point of upper capsule 810 is in the dry state, the x-axis input 'F' is crossed into the y axis. Light from 'F' enters capsule 810, reaches the dry channel, undergoes TIR, and exits upper capsule 810 as 'H' light. Because lower capsule 820 is in the wet state, this light traverses lower capsule 820 and exits parallel to the y axis. No light from 'F' exits circuit 800 along the x axis. No light exits at 'G' when upper capsule 810 is in the dry state. Because lower cell 820 is wet, there will be a small index mismatch in the gap of the channel of cell 820. Input light 'f' will be reflected into cell 820 and then will exit cell 820 as light 'I' when cell 820 is in the wet state. The light exiting cell 820 will be offset somewhat from the entry light because of the refraction and path length within the channel. (This offset is exaggerated in the drawing.) Furthermore, when cell 820 is in the wet state, a small amount of light from 'f' will exit toward 'H' (i.e., at right angles to the through path).

Were it not for the implicit nature of the matrix, this reflected light traveling down from the wet-state cell 820 would be a problem. In a matrix, however, all inputs generally enter the matrix from one direction and then leave the matrix as outputs in a direction perpendicular to that from which they entered. In this case, inputs would enter the matrix in a direction parallel to the x axis and all outputs would leave the matrix in a direction parallel to the y axis. Thus, light F would typically be an input and light f would be an output that had been selected by a switch located above switch 800 in the matrix. Implicit in this scheme is the fact that if input light F is being selected by switch 800, there will be no light coming from f. Hence, no y-axis light exits along the lower y axis when the upper capsule 810 is dry and lower capsule 820 is wet.

When the upper capsule 810 is wet and lower capsule 820 is dry, the operation of circuit 800 is more complex. Because upper cell 810 is wet, there will be a small index mismatch in the gap of the channel of cell 810. For input light 'F', the light 'G' will exit cell 810 when cell 810 is in the wet state. The light exiting cell 810 will be offset somewhat from the entry light because of the refraction and path length within the channel. (This offset is exaggerated in the drawing.) Furthermore, when cell 810 is in the wet state, a small amount of light from 'F' will exit toward 'H' (i.e., at right angles to the through path). Were it not for the dry state of lower cell 820 that blocks the light, this reflected light traveling down from the wet-state cell 810 would be a problem.

Thus, when upper cell 810 is wet, light entering from 'F' emerges along the x axis at 'G' and continues along that axis to the next switch point in the system. Some small amount of 'F' light is reflected down path 'H'. This small amount of light reaches the lower cell 820 (which is in the dry state) and undergoes TIR thereby exiting as waste light at 'I'. Therefore, no light from 'F' via 'H' exits the bottom of circuit 800 when upper cell 810 is in the wet state.

Provision is next made to allow y-axis light 'f' through the switch-point circuit 800. In this cross-bar switching arrangement, light will be coming down from switch points above circuit 800 as 'f'. When the 'f' light is to be selected, circuit 800 permits this y-axis light to traverse cell 820 to be output from circuit 800. Light from 'f' is reflected by TIR, mirror 850 to the lower cell 820, emerging from cell 820 as 'g'. Because lower cell 820 is dry, TIR carries the 'g' light out the bottom of cell 820 along the y-axis without contamination from x-axis light.

A monitoring signal is again beneficial aspect of the push-pull configuration. Circuit 800 is self-diagnosing for the most likely forms of failure which occur when liquid and gas are in the wrong place. Port 'I' is the diagnostic port of circuit 800. If the two cells 810 and 820 are operating properly, then the output at 'I' is 'r', the reflection coefficient for a wet channel and has a weak reference value 'r'. The value of 'r' is determined by the index difference between guide and fluid. The diagnostic signal for proper operation is fixed, set by the reflection coefficient 'r' regardless of which cell is in the wet state. If cells 810 and 820 are both dry, the output at 'I' is unity (high), thereby demonstrating a failure. If cells 810 and 820 are both wet cells, the output at 'I' is r*r (i.e., very weak), thereby also demonstrating a failure.

Thus, the weak monitoring signal has a known value unless there is a failure (caused by either two dry cells or two wet cells). The weakness of the monitoring signal during normal operation permits one to collect several monitoring signals into a single failure detector. If any of the pairs of cells associated with one of the monitoring signals fails, the detector can cause all of the cell pairs in the area of the matrix to which the combined monitoring signal corresponds to be reset to their desired states.

In the previous discussion, water and alcohol were presented as examples of boilable liquids that do not break down through heating. It is to be understood that these are merely examples of a wide range of simple liquids that can be used. For example, simple molecule liquids such as benzene or toluene, that have an index of refraction higher, rather than lower, than that of the waveguides, can also be employed. Furthermore, it is to be understood that mixtures of simple liquids, e.g., a mixture of water and alcohol can be used. The boiling points of the constituents of the mixture will be different. Therefore, the mixture ratio of the injected liquids need not be the same as the mixture ratio of the liquids of the reservoir pool. Moreover, polymeric or other complex liquids can also be used when heat-induced degradation of the liquid will be acceptable (e.g., in an application where there will be few wet/dry cycles over the life of the switch, so little degradation will occur).

The many features and advantages of the invention are apparent from the written description and thus it is intended by the appended claims to cover all such features and advantages of the invention. Furthers because numerous modifications and changes will readily occur to those skilled in the art, it is not desired to limit the invention to the exact construction and operation as illustrated and described. Hence, all suitable modifications may be resorted to as falling within the scope of the invention.

What is claimed is:

1. A push-pull optical switch, comprising:

a first optical switch having first and second input waveguides intersecting perpendicularly, the first optical switch also having a wet state wherein light passes through the first optical switch in a straight line and a dry state wherein light passing through the first optical switch is reflected and leaves the first optical switch in a direction perpendicular from where the light entered;

a second optical switch having an output waveguide, the second optical switch also having the wet and dry states; and at least one reflector to direct light into the second optical switch when the first optical switch has been placed in a selected one of the wet and dry states, the reflector, first and second optical switches being arranged to provide isolation between the first and second input waveguides such that if the first optical switch is in the dry state and the second optical switch is in the wet state then light input to the first input waveguide will leave the second switch through the output waveguide, and if the first optical switch is in the wet state and the second optical switch is in the dry state then light input to the second input waveguide will leave the second switch through the output waveguide.

2. The push-pull optical switch as set forth in claim 1, wherein the second optical switch further comprises a monitoring waveguide to indicate a failure condition, the failure condition occurring when the first and second optical switches are both in the dry state, the failure condition also occurring when the first and second optical switches are both in the wet state.

3. The push-pull optical switch as set forth in claim 1, wherein the first and second optical switches employ thermal injection through boiling to enter the wet state and employ thermal ejection through boiling to enter the dry state.

4. The push-pull optical switch as set forth in claim 1, wherein the at least one reflector is a single total internal reflection mirror.

5. The push-pull optical switch as set forth in claim 1, wherein the at least one reflector comprises three total internal reflection mirrors.

* * * * *